United States Patent Office 3,406,342
Patented Oct. 15, 1968

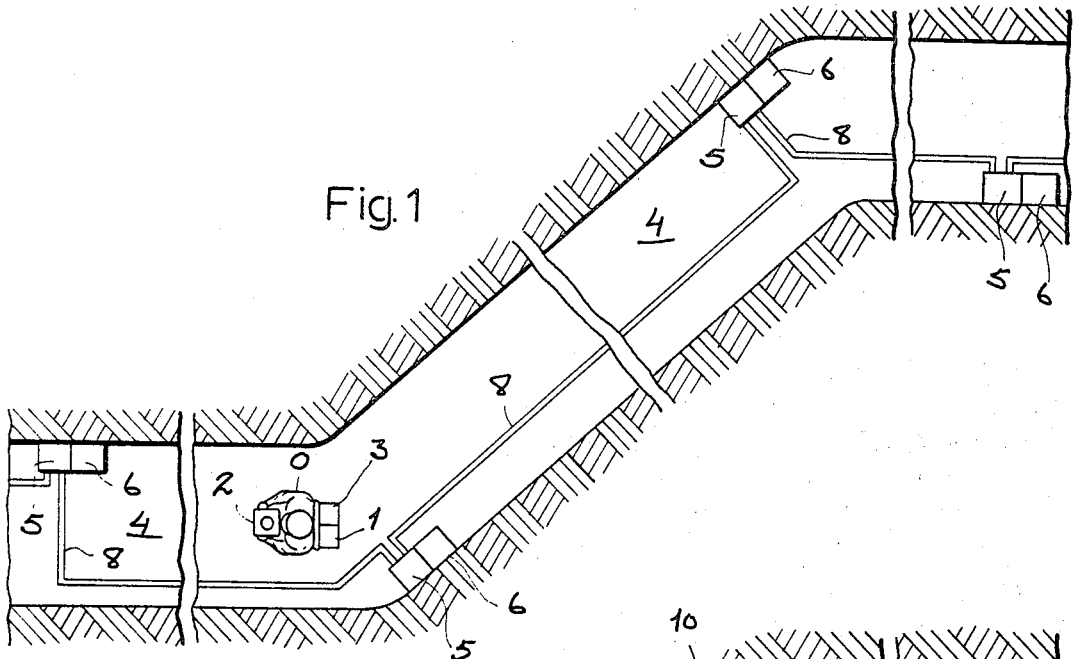
Fig. 1
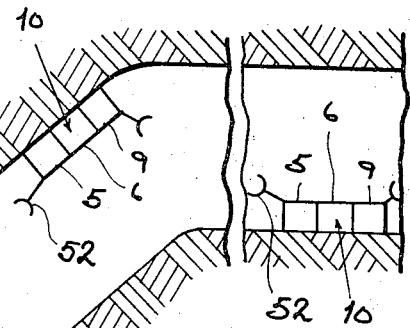
Fig. 2
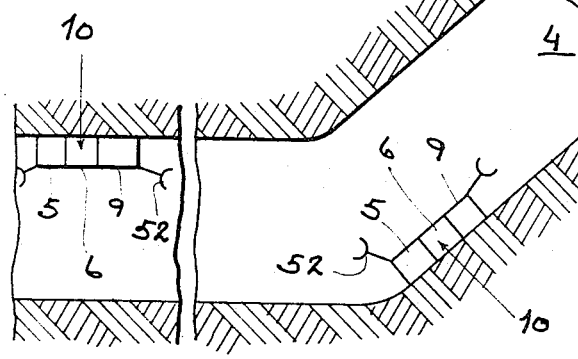

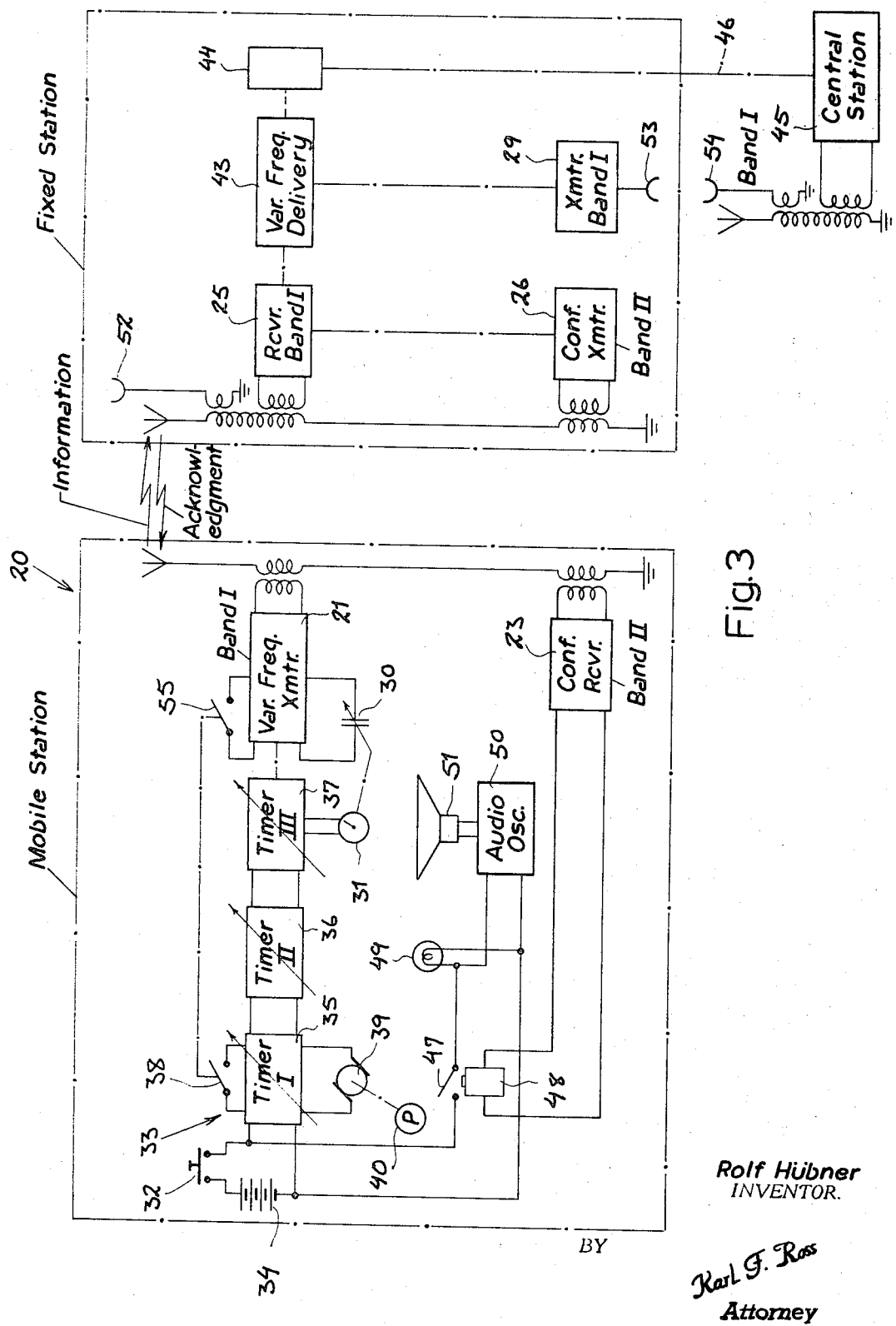

3,406,342
SAFETY MONITORING AND ACKNOWLEDGMENT SYSTEM FOR SUBTERRANEAN STRUCTURES USING RADIO RELAYS
Rolf Hübner, Westfalendamm 267, Dortmund, Germany
Filed Jan. 19, 1966, Ser. No. 521,677
Claims priority, application Germany, Jan. 21, 1965,
H 54,921
8 Claims. (Cl. 325—2)

ABSTRACT OF THE DISCLOSURE

In a subterranean tunnel having angularly adjoining stretches, a signaling system wherein fixed signaling stations are provided at the junctions between the tunnel stretches and have each a fixed receiver operable at a through frequency for receiving a similar high-frequency signal from the next fixed station along the tunnel, a relay transmitter operating at this frequency for transmitting the signal to the next fixed station along the tunnel and a mobile station with a range less than the distance between successive fixed stations. The mobile station actuating, via an information transmitter operating on another frequency, the fixed station thereby initiating a relay of the information through the tunnel in the through frequency. Each fixed station also has a transmitter producing an acknowledgment signal triggered upon receipt of the information signal for indicating such receipt to the mobile station.

My present invention relates to a wireless signal system for subterranean structures and, more particularly, to a system for the transmission of measuring, control and warning signals along mine shafts and tunnels and like subterranean structures.

In my copending applications Ser. No. 416,655 of Dec. 7, 1964 (now U.S. Patent 3,266,293), Ser. No. 427,047 of Jan. 21, 1965 (now U.S. Patent 3,375,700), and Ser. No. 440,223 of Mar. 16, 1965 (now U.S. Patent 3,343,402), I describe various improvements in gas-analyzing devices adapted to be carried by mine-operating or mine inspection personnel for the analysis of ambient gases to determine the concentration of one or more particular components of the gas mixture. Essentially, such devices include a housing provided with a rechargeable battery or other source of electric current, a gas-analysis or measuring chamber with concentration-sensitive means, electrically operable pump means for inducing a flow of ambient gas into the measuring chamber, and a timer circuit for initially operating the pump means and subsequently operating a measuring circuit (e.g. a resistance bridge) coupled with the concentration-sensitive means for providing upon a meter or other indicator a visible registration of the proportion of carbon dioxide, carbon monoxide, methane or other component of the ambient gas. In general, such devices require reporting of the value of such concentration at frequent intervals or the signaling of an emergency warning to a mine office upon the attainment of a danger level of the gas. Since such reporting may involve human error and requires the operating personnel to return to the central location, it has involved many difficulties. Even the use of intercommunication systems, telephones and other networks extending through the mine shafts and columns has not been overly effective.

Furthermore, the use of radio-frequency transmitters and receivers for the wireless delivery of gas-analysis information, control or warning signals and the like from locations in the mine shafts and tunnels to a central location has hitherto been unsatisfactory. Firstly, the very nature of a subterranean structure prevents such signals from being transmitted from place to place without distortion especially in iron mines or the like in which the ore or other strata serve to screen out radio waves. Thus, the use of radio transmitters and receivers of conventional systems cannot be applied to mines since such structures act as do large steel buildings, bridges and the like in restricting the passage of radio waves. Secondly, in most mines, the tunnels are of winding configuration and have many bends and corners to intercept and block the radio waves. Even in coal mines, the strata block passage of radio waves and radio transmission is interrupted or distorted by the presence of iron mine props or the like. While reference will be made hereinafter to the subterranean transmission of signals and specific application is made of the present system for delivery of gas-analyser meaurements to a central location or the transmission of warning indications thereto, it will be understood that the system is equally applicable and is intended to refer also to control signals transmitted through the tunnels and shafts for operation of modern mining (or ore recovery) machinery. Thus, the limitation of the use of conventional wireless systems in mines or other subterranean structures derive in large measure from the fact that the relatively long tunnels have proportionally small cross-sections so that the straight-line passage of radio waves is frequently interrupted by walls of bent portions of a mine tunnel. The effective range of wireless transmitters and receivers is relatively short within such tunnels and the effect of ambient influences upon the radio reception of transmission at different locations along the tunnel varies, thereby preventing a positive indication or detection of gas concentration or other parameters.

It is, therefore, the principal object of the present invention to provide a relatively simple but effective wireless system for the communication of a signal through mine shafts and tunnels or other subterranean structures without the disadvantages of prior systems as described above.

A more specific object of this invention is to provide an improved communication network for the transmission of measurement, warning or control signals through mine tunnels of relatively small cross-section and of tortuous configuration.

Still another object of my present invention is to provide an improved system for the transmission of gas-measuring information along a mine tunnel without the need for a return of the operator of the analyser to the surface.

A further object of the invention is to provide an improved signaling system for subterranean structures which is capable of ensuring that a warning or other indication has been duly received without interfering with such reception.

I have found that the foregoing objects and others which will be apparent hereinafter, can be attained in a wireless signal-transmitting system for mines and the like which comprises at least one mobile station, preferably carried by the inspection or operating personnel of the mine, and a plurality of fixed stations spaced along the mine tunnel or other subterranean structure; the present improvement resides in the provision of a receiver at each of these fixed stations which co-operates with a transmitter of the mobile station when in range of the latter to deliver an indication of warning, measurement or control to a central station or other location remote from the fixedly located receiver, the latter energizing, at the fixed station, a confirmation transmitter adapted to direct an acknowledgment signal of different frequency from that used to convey the information to the mobile station at which an optical or acoustic indication is provided to inform the operating personnel of the portable station that the information has been duly received. The information delivered from the mobile station to the or each fixed station is thus transmitted in a radio-frequency band which is distinct from that of the acknowledged signal so that no interference can develop between the information and the confirmation and the operator is able to obtain a definite indication of receipt of the message. Thus, the system can also be used in a control sense whereby the receipt of the acknowledgment signal can be used to set or regulate a control program at the mobile station.

According to a further feature of the present invention the information transmitter of the mobile station produces a variable frequency output controlled by a sensing device (e.g. a gas analyser) over a wide band which, however, is outside the band of the acknowledgment signal. The transmitter can thus be of the frequency-modulated type for information-transmission, e.g. provided with a frequency-varying capacitor coupled with the indicator of the measuring circuit of the gas analyser. The information transmitter and the acknowledgment-signal receiver at the mobile station need not form an entity with the measuring device but can be constituted as one unit independent of the measuring device or as separate units in a pack carried by the operator. A rucksack or other carrying means can be provided for the transportation of the information transmitter and the acknowledgment receiver on the back of the user, while the measuring (e.g. gas-analysing) device can be supported on the chest of the user or from a shoulder strap. Since the range of the mobile station need not be great because of the spaced locations of the fixed stations, the energy requirements of the information transmitter and acknowledgement receiver are proportionately little and a lightweight power pack (e.g. a storage battery) can be used to keep the weight of the portable station at a minimum. Under these circumstances, each employee in the mine tunnel can be constituted as a mobile station for providing measuring or warning indications without interfering with his activities. The power requirements of this system can be reduced to a still greater extent "measuring" pushbutton also energizes the transmitter at the mobile station.

According to a more specific feature of this invention, the spacing between the fixed stations or, at least, the receivers thereof, is selected so that they are of no greater distance than twice the range of the information transmitter with respect to the sensitivity of the information receivers at the fixed stations. In practice, however, it will be convenient to make the distance between the fixed stations somewhat less so that their effective reception ranges overlap. This enables the portable units to be very compact and lightweight while ensuring that any indication of trouble or any reading of the analyzing system will cause an immediate relay of the information regardless of where in the tunnel the information transmitter happens to be located. While the information transmitter can be provided with any means for relaying its output to a central station, it has been found to be advantageous to employ relay networks or the like in sufficiently close proximity to permit transfer of information along the tunnel without distortion. The relay transmitters and receivers are of a conventional type and can make use of a frequency different from that of the acknowledgment signal but identical with that of the information signal. In the latter case, the successive stations serve as original receivers for information from a mobile stations for information derived from another fixed station. Wire connection between the fixed stations and to the central location is also possible.

When relay stations are provided, these stations are advantageously disposed alternately on opposite walls of the tunnels at the corners thereof when the latter are undulating. The relay stations preferably are provided with antennae and the like designed to directionally transmit their output to the next successive station with the stations being in line-of-sight relationship. In this manner, signal transfer between fixed stations can be effected with a minimum of interference and distortion. When the stations are connected by wire, such wire can constitute the antenna for receiving the transmissions of the mobile station or stations. In all cases, however, the receiving antenna of the relay stations should effectively scan the full cross-section of the subterranean chambers in order to limit any failure to pick up the signals transmitted from a prior relay station. The relay and receiving stations at fixed locations throughout the tunnel are advantageously provided with individual energy sources (e.g. storage batteries) to enable them to operate for periods on the order of at least one month since the size of the energy pack is immaterial at the fixed locations. This arrangement permits the fixed stations to be set up and removed with ease and ensures that a power failure will not adversely affect warning the signal systems in the mine.

The wireless system thus provides for an immediate indication to the mobile operator that his transmission has been properly received and forwarded to the central station and is effective in spite of the nature of the subterranean chambers in which it is employed. In effect, the response of the system is significantly greater than telephone warning systems and can be operated even when the operating personnel are overcome by gases or are injured. It is not required that such personnel proceed to one of the fixed locations prior to transmission of a warning.

The above and other objects, features and advantages of the present invention will become more readily apparent from the following description, reference being made to the accompanying drawing in which:

FIG. 1 is a section overlooking a mine tunnel embodying a system in accordance with the present invention;

FIG. 2 is a view similar to FIG. 1 of a modified system; and

FIG. 3 is a block diagram illustrating significant features of the present invention.

Referring first to FIG. 3, it will be seen that a mobile station 20, in accordance with this invention, can include a variable frequency transmitter 21 whose output frequency can be adjusted by a variable capacitor 30 which follows the indicator 31 of a gas-analyzing device of the type described in the aforementioned copending applications. The gas-analyzing device, generally designated 33, can include a rechargeable battery 34 in series with a main switch 32. The control circuit of the gas analyzer is here diagrammatically illustrated as including a chain of transistor timers 35, 36 and 37 which are described in detail in my copending application Ser. No. 521,395 filed Jan. 18, 1966, and entitled "Portable Gas Analyser With Time Delay." The first timer 35 can be energized by closing a switch 38 and initiates operation of a pump means whose motor 39 drives the pump 40 to induce a flow of ambient gas into the measuring chamber of the portable measuring device. The measuring chamber is provided with a concentration-sensitive element, not shown, and is adapted to provide an indication of the concentration of one component of the gas mixture. After a period of operation of the pump means, which can be adjusted in accordance with the size of the pump chamber and the degree of purging of the chamber required, the timer 35 cuts off the pump means 39, 40 and energizes a second timer network 36 which establishes an adjustable but predetermined delay of 1–5 seconds after deactivation of the pump means to permit the gas within the measuring chamber to reach a quiescent state. After this delay period, the timer 36 triggers the third timer network 37 to energize the measuring network for another variable but predetermined time period with the measurement being shown upon indicator 31. The indicator is coupled with the variable capacitor 30, as previously described, so that the FM transmitter 21 will have a radio-frequency output at its antenna 41 which is in the decimeter or centimeter wave-length range. A transmitter of this type is described on page 251ff of Fundamentals of Electronics A.F. 101–8, 1957, U.S. Government Printing Office, Washington, D.C.

At the fixed station, I provide the receiver 25 whose antenna 42 may be a wire connecting the fixed stations along the mine, which is responsive to the range of frequencies of transmitter 21 (band I) and can be of the type illustrated and described at pages 358, 359 of RCA Receiving Tube Manual, Technical Series RC 19, 1959, with its output supply as a variable frequency delivery to an amplifier 43. Any conventional amplifier may be used for this purpose. From the amplifier 43 the signal may be transmitted to other stations as represented at 44 by wire and eventually communicated to the central station 45 via the transmission line 46.

When the receiver 25 is energized by a transmitted signal from the mobile station 20, it triggers the confirmation transmitter 26 which delivers an acknowledgment signal to the antenna 42 (e.g. a line connecting the fixed stations) for transmission to the mobile station 20. The acknowledgment signal is of a frequency outside the band of the information signal and, when picked up by the antenna 41 of the mobile station within range of the receiver 25, operates a confirmation receiver 23 at the mobile station. The confirmation receiver 23 can be coupled to the antenna 41 for this purpose and initiates an optical or acoustical signal at the mobile station to indicate to the operator that the information has been duly transmitted to the central station 45 and, of course, duly received by the fixed station. The optical and acoustical indicia are generated, for example, via a relay 48 whose contact 47 is in series with a lamp 49 and an audio-frequency oscillator 50 whose output is applied to an electroacoustic transducer 51. The confirmation receiver 23 can be of the FM or AM type and any conventional circuit, such as the receiver circuit previously described, can be employed. A suitable audio-frequency oscillator for use as represented by the oscillator 50, is illustrated on pages 5–31ff of The Handbook of Selected Semiconductor Circuits Nobsr 73231; U.S. Government Printing Office, 1960.

When the fixed station is provided in a wireless system for retransmission of information, it can have a directional antenna 52 trained upon the next successive fixed station at the opposite wall of the tunnel and at a distance therefrom within range of its relay transmitter and preferably in line-of-sight. Correspondingly, each fixed station is provided with a relay transmitter 29 whose relay antenna 53 is trained upon the directional receiving antenna 52 of the next station along the transmission line. The central station may have a corresponding receiving antenna 54 for receipt of the delayed signal.

Referring now to FIG. 1, in which the orientation of the fixed station is shown in greater detail, it will be apparent that the operator O is provided with a rucksack or other backpack for the variable-frequency information transmitter 1 (corresponding to the transmitter 21 of FIG. 3) and a confirmation-signal receiver 3 (corresponding to the receiver 23). In front of the operator, he carries the measuring or gas-analyzing device 2 which is connected to the transmitter 1 and is provided with an indicator means (i.e. a lamp and an audio generator), as described in connection with the mobile station of FIG. 1. The arrangement is so designed that the amplitude or magnitude of the concentration measurement of the device 2 is converted into a change of frequency of the output of transmitter 1, as in the case when switch 38 is closed, thereby triggering the switch 55 of the transmitter 21; the energization of the "measure" button of the gas analyser energizes the transmitter 1. Along the tortuous mine tunnel 4, the fixed stations 5, 6 are disposed in spaced relationship such that the distance between them is not greater and is preferably less than twice the range of the transmitter 1. Each fixed station includes a receiver 5 (corresponding to the receiver 25) and a confirmation transmitter 6 (corresponding to the transmitter 26) which is operated upon interception of an information signal by the receiver 5 and transmits an acknowledgement signal of a frequency different from the frequency of the information signal.

In the embodiment of FIG. 2, each receiver 5 is provided with a relay transmitter 9 (corresponding to the transmitter 29 of FIG. 3) whose output is of the frequency of the information signal picked up by the respective receiver 5. The relay stations 10 are thus constituted by the respective receiver 5 and transmitter 9 and are spaced along the tortuous tunnel 4 and disposed alternately on opposite walls thereof. The wireless transmission of the information through the tunnel permits the stations to be mounted and dismounted rapidly. Moreover, it has been found advantageous to provide the relay stations, in addition to where they are necessary because of their range, at the corners of the tunnel. When long straight stretches of the tunnel are to be covered, a number of such stations may be required along this stretch. The relay stations 10 are, as indicated, in line-of-sight relationship and provided with directional and mutually aligned antennae and preferably operate with frequencies in the decimeter and centimeter wavelength range. The directional antennae 52 of the receivers of the stations are dimensioned and trained so that they intercept substantially the full cross-section of the mine tunnel whereby they intercept not only the output of the prior relay station but also the signal generated by the mobile station.

The invention described and illustrated is believed to admit of many modifications within the ability of persons skilled in the art, all such modifications being considered within the spirit and scope of the appended claims.

I claim:
1. In a subterranean structure including at least one tunnel with angularly adjoining stretches, a signal transmission system, comprising:
  (a) a terminal station provided with a monitor for overseeing conditions in said subterranean structure;
  (b) a plurality of fixed stations each disposed substantially at a junction of the angularly adjoining stretches and including:
    (1) a radio-frequency receiver operable at a through frequency,
    (2) a radio-frequency relay transmitter adapted to generate through frequency and operable upon the receipt thereof by the corresponding receiver from the next upstream fixed station along said tunnel for transmitting said through frequency to the receiver of the next downstream fixed station and thereby propagate a chain of signals along said tunnel from fixed station to fixed station to said monitor at said terminal station, and
    (3) radio-frequency responsive information-receiving means associated with the respective receiver and relay transmitter at each fixed station for generating an information-carrying mode of the through frequency transmitted from the said fixed station along said tunnel to said terminal station; and
  (c) a mobile station movable along said tunnel and including:
    (1) a radio-frequency information transmitter energizable upon the detection of a condition of said tunnel for transmitting an information signal to the information-receiving means of a proximate one of said fixed stations, said information-receiving means being constructed and arranged to transmit a radio-frequency acknowledgment signal of a frequency different from that of said through signal upon the receipt of said information signal from said mobile station, (2) a confirmation receiver responsive to said acknowledgment signal, and (3) indicating means operable by said confirmation receiver for producing an observable indication to an operator of the mobile station of receipt of said information signal by said proximate one of said fixed stations.

2. A signal transmission system as defined in claim 1 wherein said fixed stations are spaced along said tunnel by a distance equal to at most twice the range of said information receiver with respect to the information signal of said mobile station, said fixed stations being in line-of-sight relationship and being trained directionally upon one another while operating at frequencies in the wavelength range of decimeters and centimeters.

3. A signal-transmission system as defined in claim 2 wherein said indicating means includes an acoustic device adapted to produce an audio signal in response to the receipt by said confirmation receiver of said acknowledgment signal.

4. A signal-transmission system as defined in claim 2 wherein said indicating means includes a lamp energizable upon receipt by said confirmation receiver of said acknowledgment signal to produce an optical signal.

5. A signal-transmission system as defined in claim 2 wherein said information transmitter has a variable frequency output, said mobile station being provided with a gas-analyzing device coupled with said information transmitter for controlling the frequency thereof in accordance with the gas concentration in said passage.

6. A signal-transmission system as defined in claim 5 wherein said device is provided with a measuring switch for energizing same, said switch being operatively connected with said information transmitter for the simultaneous energization thereof.

7. A signal-transmission system as defined in claim 5 wherein said fixed stations are disposed at corners of said tunnel alternately on opposite walls thereof.

8. A signal-transmission system as defined in claim 2 wherein each of said fixed stations is provided with a receiving antenna trained upon the entire cross-section of said tunnel, said fixed stations each being provided with rechargeable energy sources and free from any electrical connection with one another.

References Cited

UNITED STATES PATENTS

| | | | |
|---|---|---|---|
| 1,470,430 | 10/1923 | Ellison | 325—28 X |
| 2,219,653 | 10/1940 | Krügel | 333—95 |
| 2,408,878 | 10/1946 | Preston | 325—31 |
| 3,104,356 | 9/1963 | Hedger | 325—31 |
| 3,155,909 | 11/1964 | Shepherd | 325—51 |
| 3,221,320 | 11/1965 | Yoneda | 340—237 |
| 3,278,850 | 10/1966 | Tomizawa et al. | 325—52 |

ROBERT L. GRIFFIN, *Primary Examiner.*

B. V. SAFOUREK, *Assistant Examiner.*